UNITED STATES PATENT OFFICE.

FRANCIS A. J. FITZGERALD, OF NIAGARA FALLS, NEW YORK.

PROCESS OF MAKING CARBORUNDUM ARTICLES.

SPECIFICATION forming part of Letters Patent No. 650,234, dated May 22, 1900.

Application filed August 7, 1899. Serial No. 726,472. (No specimens.)

*To all whom it may concern:*

Be it known that I, FRANCIS A. J. FITZGERALD, of Niagara Falls, in the county of Niagara and State of New York, have invented a new and useful Improvement in Making Carborundum Articles, of which the following is a full, clear, and exact description.

Although it frequently happens that carborundum carbid of silicon as made in the electric furnace is found in masses whose crystals are held together with more or less strength or firmness of cohesion, such masses have not been sufficiently solid to permit of use in the arts without first separating the loosely-held grains, cementing them or binding them together with clay or like bond, and firing the same. The necessity for this is apparent when it is considered that of the original mixture used in the manufacture of carborundum over sixty per cent. is driven off as gas or vapor, and as the carborundum crystals occupy approximately the same space as the original mixture and have a higher specific gravity it follows that the masses are necessarily porous and loosely knit together. The bond of clay is sometimes objectionable and detracts from the value of the molded articles—as, for example, when the articles are to be exposed to a temperature sufficient to destroy the binding material.

In the practice of my invention I press the grains or powder of carborundum of suitable size into the shape desired, which may be the shape of a finished article, and I may employ for such purpose any adhesive material which will hold the grains together even temporarily. For example, the grains may be mixed with a dilute solution of glue and then pressed into shape. The mass so molded is then heated in an electric furnace to or about the temperature originally used to produce the carborundum, and when so treated I have discovered that the carborundum will recrystallize and will produce a very hard dense mass occupying, substantially, the same space into which it was compressed and without substantial loss of material by vaporization in such treatment, except the volatilizing of the material which may have been employed as a temporary bond. I may make in this way refractory bricks or crucibles composed, when finished, of practically nothing but carborundum, or I may treat as above described carborundum articles molded into shape suitable for purposes of abrasion.

Where it is desired that the molded carborundum article should be an electrical conductor, I may mix a conductor of electricity with the crystals, and I prefer to use graphite for such purpose, adding it, preferably, in the proportion of fifteen to twenty parts of graphite to eighty-five to eighty parts of carborundum; but these proportions may be varied to any desired extent.

I claim—

1. The method herein described which consists in compressing a mass of carborundum and causing the same to recrystallize by heating the same to an intense degree; substantially as described.

2. The method herein described which consists in compressing a mass of carborundum to the desired form and then subjecting the same to about the degree of heat required for the original formation of silicon carbid; substantially as described.

In testimony whereof I have hereunto set my hand.

FRANCIS A. J. FITZGERALD.

Witnesses:
E. E. ARISON,
CHAS. O. TAYLOR.